United States Patent
Steynberg

(10) Patent No.: US 7,772,291 B2
(45) Date of Patent: Aug. 10, 2010

(54) PRODUCTION OF LIQUID AND, OPTIONALLY, GASEOUS HYDROCARBONS FROM GASEOUS REACTANTS INTO AN EXPANDED SLURRY BED

(75) Inventor: André Peter Steynberg, Vanderbijlpark (ZA)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 608 days.

(21) Appl. No.: 11/596,253

(22) PCT Filed: Apr. 28, 2005

(86) PCT No.: PCT/IB2005/051382

§ 371 (c)(1),
(2), (4) Date: Aug. 13, 2007

(87) PCT Pub. No.: WO2005/107935

PCT Pub. Date: Nov. 17, 2005

(65) Prior Publication Data
US 2008/0293834 A1 Nov. 27, 2008

(30) Foreign Application Priority Data
May 10, 2004 (ZA) .................................. 2004/3548

(51) Int. Cl.
*C07C 27/00* (2006.01)
(52) U.S. Cl. ........................................ 518/700; 518/705
(58) Field of Classification Search ................. 518/700, 518/705
See application file for complete search history.

(56) References Cited

U.S. PATENT DOCUMENTS

| 2,276,274 A | 3/1942 | Keith, Jr. |
| 2,463,912 A | 3/1949 | Scharmann |
| 5,733,829 A | 3/1998 | Tange et al. |
| 5,733,839 A | 3/1998 | Espinoza et al. |
| 5,961,933 A | 10/1999 | Casanave et al. |

(Continued)

FOREIGN PATENT DOCUMENTS

EP     0 450 860 A2     3/1991

(Continued)

OTHER PUBLICATIONS

Fischer-Tropsch Reactor Selection, Joseph M. Fox III, Catalysis Letters 7 (1990) pp. 281-292.

*Primary Examiner*—Jafar Parsa
(74) *Attorney, Agent, or Firm*—Baker & Hostetler LLP

(57) ABSTRACT

A process for producing liquid and, optionally, gaseous products from gaseous reactants includes feeding at a low level a gaseous reactants feed comprising at least CO and $H_2$ into an expanded slurry bed of solid non-shifting hydrocarbon synthesis catalyst particles suspended in a suspension liquid, the expanded slurry bed having an aspect ratio of less than 5. The gaseous reactants and any recycled gas are allowed to react with a per pass CO plus $H_2$ conversion of at least 60% as they pass upwardly through the slurry bed at a gas velocity of at least 35 cm/s, thereby to form liquid and, optionally, gaseous products, and with the gaseous reactants and any recycled gas and any gaseous product assisting in maintaining the solid catalyst particles in suspension in the suspension liquid, and with the liquid product forming together with the suspension liquid, a liquid phase of the slurry bed.

9 Claims, 1 Drawing Sheet

U.S. PATENT DOCUMENTS

| | | |
|---|---|---|
| 2002/0035163 A1 | 3/2002 | Vogel et al. |
| 2003/0027875 A1 | 2/2003 | Zhang et al. |
| 2003/0109590 A1 | 6/2003 | Schweitzer et al. |
| 2003/0114543 A1 | 6/2003 | Zhang et al. |

FOREIGN PATENT DOCUMENTS

| | | |
|---|---|---|
| WO | WO 03/052335 | 6/2003 |
| WO | WO 2004/101475 A1 | 11/2004 |

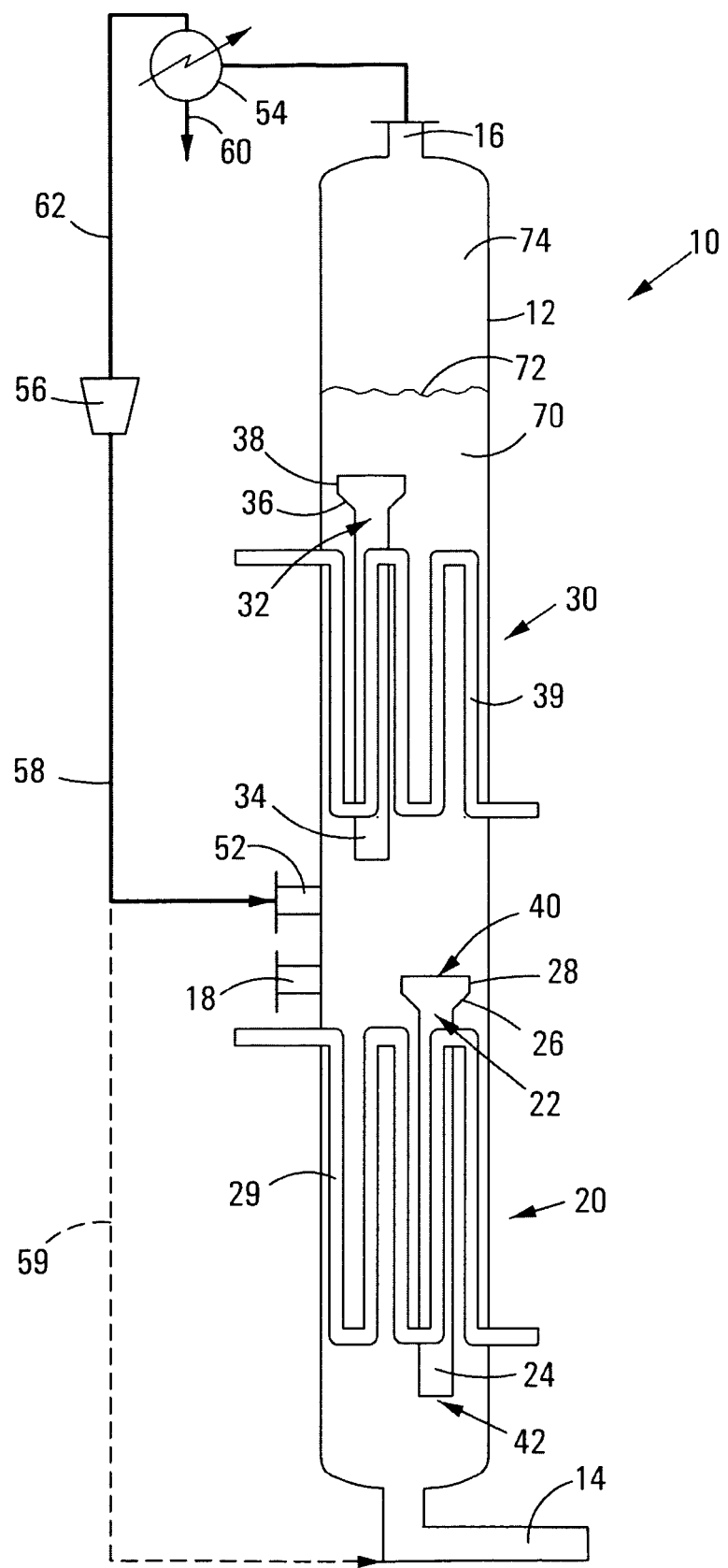

PRODUCTION OF LIQUID AND, OPTIONALLY, GASEOUS HYDROCARBONS FROM GASEOUS REACTANTS INTO AN EXPANDED SLURRY BED

CROSS-REFERENCE TO RELATED APPLICATIONS

This is a national stage of International Application No. PCT/IB2005/051382, filed on Apr. 28, 2005, which claims priority off South African Patent Application No. 2004/3548, filed May 10, 2004, the disclosure of each application is hereby incorporated by reference in their entirety.

FIELD OF THE INVENTION

THIS INVENTION relates to a process for producing liquid and, optionally, gaseous products from gaseous reactants.

BACKGROUND OF THE INVENTION

There is a generally held belief by those skilled in the art that conversion in a slurry bed hydrocarbon synthesis reactor rapidly declines with increasing gas velocity as a result of increased mixing at higher velocities, so that conversion at high velocities in reactors with a small aspect ratio of less than 5 is restricted. The inventors have surprisingly found that this is not correct.

SUMMARY OF THE INVENTION

According to the invention, there is provided a process for producing liquid and, optionally, gaseous products from gaseous reactants, the process including feeding at a low level a gaseous reactants feed comprising at least CO and $H_2$ into an expanded slurry bed of solid non-shifting hydrocarbon synthesis catalyst particles suspended in a suspension liquid, the slurry bed being contained in a vessel and the expanded slurry bed having an aspect ratio of less than 5;

optionally, feeding a recycle gas stream into the slurry bed; allowing the gaseous reactants and any recycled gas to react with a per pass CO plus $H_2$ conversion of at least 60% as they pass upwardly through the slurry bed at an inlet superficial gas velocity of at least 35 cm/s, thereby to form liquid and, optionally, gaseous products, and with the gaseous reactants and any recycled gas and any gaseous product assisting in maintaining the solid catalyst particles in suspension in the suspension liquid, and with the liquid product forming together with the suspension liquid, a liquid phase of the slurry bed;

allowing any gaseous product and unreacted gaseous reactants and any unreacted recycled gas to disengage from the slurry bed as gaseous components into a head space above the slurry bed;

withdrawing the gaseous components from the head space;

withdrawing liquid phase from the slurry bed, to maintain the slurry bed at a desired level; and optionally, recycling some of the gaseous components from the head space to provide the recycle gas stream.

In this specification, the term "aspect ratio" refers to the ratio of the expanded slurry bed height to the internal diameter of the reaction vessel containing the bed, or nominal internal diameter in the case of a non-circular cylindrical reaction vessel. The nominal internal diameter of a non-circular cylindrical vessel is the diameter of a circle which would have the same area as the internal cross-sectional area of the non-circular cylindrical vessel. The slurry bed is thus contained or provided in a reaction zone of a three phase reaction vessel, such as a slurry reactor or bubble column. The slurry reactor or bubble column uses a three-phase system, i.e. solid catalyst particles, liquid product, and gaseous reactants (including any recycled gas) and, optionally, gaseous product and inert gases.

The inlet superficial gas velocity is calculated using the reactor internal diameter and the volumetric flow of gas at the reactor inlet prior to any reaction. The volumetric flow is based on the temperature and pressure operating conditions at the reactor inlet.

The expanded slurry bed may have a height of less than about 40 m, preferably between about 30 m and about 40 m, e.g. about 38 m. Typically, the slurry bed has a diameter of at least 6 m.

Preferably, the per pass CO plus $H_2$ conversion is at least about 61%, more preferably at least about 62%, most preferably at least about 64%.

Preferably, the catalyst particles are present in the slurry bed in an average concentration of at least 14% by volume. Although not wishing to be bound by theory, the Applicant believes that it is possible that the high slurry viscosities at these catalyst loadings may help to inhibit gas mixing at the high superficial gas velocity of the process of the invention, thereby improving reactor productivity.

Typically, the process is a single stage process, i.e. the process comprises operating at least one multi-pass hydrocarbon synthesis stage with the multi-pass hydrocarbon synthesis stage not being followed or preceded by another hydrocarbon synthesis stage, although naturally the process may include a plurality of the multi-pass hydrocarbon synthesis stages in parallel. Thus, preferably, the recycle gas stream is present and is being fed into the slurry bed at a volumetric ratio of recycle gas stream/gaseous reactants feed of at least 0.4.

By "non-shifting hydrocarbon synthesis catalyst" is meant a hydrocarbon synthesis catalyst which, at the operating conditions of the hydrocarbon synthesis stage, does not convert more than 2% of any CO passing through the slurry bed into $CO_2$.

Typically, the $H_2$ and CO are present in the gaseous reactants feed in an $H_2/CO$ molar ratio of not more than 2, but preferably in an $H_2/CO$ molar ratio of not less than 1.7. In other words, there is an excess CO in the gaseous reactants feed above stoichiometric requirements for hydrocarbon synthesis, thereby advantageously to suppress the undesirable formation of methane in the synthesis stage.

It is to be appreciated that the gaseous reactants feed typically includes a substantial portion of inert and diluent gases, such as $N_2$. Another gas typically present in the gaseous reactants feed is $CO_2$, which can be considered for all practical purposes to be an inert gas when the catalyst is a non-shifting catalyst. As is known to those skilled in the art, although these inert or diluent gases are undesirable, they are inevitably present because it would be uneconomical to attempt to avoid or remove these gases.

The liquid products and optional gaseous products may include products typical of Fischer-Tropsch synthesis, such as $C_3+$ hydrocarbons and oxygenates, e.g. ethanol. The process may be a Fischer-Tropsch hydrocarbon synthesis process. The suspension liquid may thus be liquid product, and the catalyst may be a non-shifting Fischer-Tropsch catalyst, such as a supported cobalt catalyst. The catalyst particles may have a desired particle size range, e.g. no catalyst particles greater than 300 microns and less than 5% by mass of the catalyst particles being smaller than 22 microns.

The process may include cooling the gaseous components from the head space to condense liquid product, e.g. liquid hydrocarbons and reaction water, separating the liquid product from the gases to provide a tail gas, and optionally recycling at least some of the tail gas to the slurry bed as the recycle gas stream.

The process may include feeding, as an additional gas feed, at least a portion of the recycle gas stream, when present, into the slurry bed above the level at which the gaseous reactants feed is fed into the slurry bed. The additional gas feed may be fed at a level which is located between about 20% and about 80% of the vertical height of the slurry bed, preferably above 30% of the vertical height of the slurry bed.

The additional gas feed may be introduced into the slurry bed by means of a gas sparger.

The additional gas feed may make up at least 10% of the total volumetric feed rate of gas entering the slurry bed. Typically, the additional gas feed does not make up more than 60% of the total volumetric feed rate of gas entering the slurry bed.

The slurry reactor or bubble column may thus be maintained at normal elevated pressure and temperature conditions associated with Fischer-Tropsch synthesis reactions, e.g. a predetermined operating pressure in the range 10 to 50 bar, and a predetermined temperature in the range 160° C. to 280° C., or even higher for the production of lower boiling point product. Typically, the temperature range is 220° C. to 260° C.

The catalyst particles in the slurry bed are thus maintained in suspension by the turbulence created by the synthesis gas stream (fresh and optional recycled) passing through the slurry bed, i.e. bubbling through the slurry bed. The inlet superficial gas velocity of at least 35 cm/s through the slurry bed is thus sufficiently high to maintain the slurry bed in a state of turbulence or suspension.

The process may include recycling the liquid phase through the slurry bed. In particular, the process may include allowing slurry to pass downwardly from a high level in the slurry bed to a lower level thereof, using slurry redistribution means or slurry redistributors, thereby to redistribute heat, liquid phase and catalyst particles within the slurry bed.

In this specification, the term "slurry redistribution means" or "slurry redistributors" is intended to refer to physical apparatus used to redistribute slurry and catalyst particles vertically inside the reactor vessel, and does not refer to the slurry and catalyst particle redistribution action of the gas passing upwards through the slurry bed. The slurry redistribution means may thus include downcomers or draught tubes or mechanical redistribution apparatus such as pipes and pumps and filters.

When the slurry redistribution means includes downcomers, the downcomers may be arranged in a first downcomer region and a second downcomer region, with the second downcomer region being vertically spaced with respect to the first downcomer region.

The downcomers or draught tubes may thus be located at different levels or vertical elevations within the slurry bed. The second downcomer region may be located at a higher level than the first downcomer region, and, if desired, further downcomer regions, each containing at least one downcomer or draught tube may be provided above the second downcomer region, with a third and any subsequent downcomer regions also being spaced vertically from one another.

In one embodiment of the invention, the second downcomer region may overlap the first downcomer region. In other words, the lower end(s) of the downcomer(s) in the second downcomer region may overlap the upper end(s) of the downcomer(s) in the first downcomer region. In another embodiment of the invention, however, the second downcomer region may be located in non-overlapping relationship with respect to the first downcomer region. In other words, the lower end(s) of the downcomer(s) in the second downcomer region may be spaced with vertical clearance from the upper end(s) of the downcomer(s) in the first downcomer region.

The downcomer(s) in the second downcomer region may be staggered with respect to that (those) in the first downcomer region, when the reactor or vessel is seen in plan view. In other words, the lower end(s) of the downcomer(s) in the second downcomer region preferably does(do) not discharge slurry directly above the upper end(s) of the downcomer(s) in the first downcomer region.

Each downcomer may comprise a lower transport section and an upper disengagement or degassing section of greater cross-sectional area than the transport section. The sections are preferably circular in cross-section, is of cylindrical form, with an outwardly upwardly flaring connecting component connecting the disengagement section to the transport section. However, the disengagement section can, if desired, be in another suitable form, e.g. in the form of a rectangular or triangular section channel, as determined by the space available inside the reactor vessel.

While each downcomer will normally be located entirely within the slurry bed i.e. inside the reactor, with the degassing section typically aligned axially with the transport section, the transport section and, optionally, part of the degassing section can, instead, be located outside the reactor, with the lower outlet end of the transport section and at least the upper inlet end of the degassing section then, however, being located inside the reactor in the slurry bed or the slurry bed zone. If desired, the transport and degassing sections may be cooled by indirect cooling means; for example, pipes through which boiler feed water is passed.

The process may include operating the hydrocarbon synthesis stage such that the slurry bed is in a heterogeneous or churn-turbulent flow regime and comprises a dilute phase consisting of fast-rising large voids of gaseous reactants, and, possibly gaseous product, which traverse the reaction zone or slurry bed virtually in a plug flow manner, and a dense phase comprising liquid phase, i.e. liquid product, solid catalyst particles, and entrained smaller voids of gaseous reactants and, possibly, gaseous product.

The gaseous reactants feed may be any synthesis gas derived from any source, such as coal-derived synthesis gas or natural gas derived synthesis gas. However, it is expected that the invention will find particular application in cases where the gaseous reactants feed is a natural gas derived synthesis gas.

The ratio of recycle gas stream/gaseous reactants feed may be in a range with a lower limit of 0.4 as hereinbefore indicated, with an upper limit of the range being about 1.5. The lower limit may however be higher at about 0.5, or even higher at about 0.6. The upper limit may be lower at about 1.3, or even as low as about 1. In one embodiment of the invention, the ratio is about 0.8.

The catalyst particles may be present in the slurry bed in a range with a lower limit of 14% by volume as hereinbefore indicated, with an upper limit of the range being about 50% by volume. The upper limit may be lower at about 40% by volume, or even lower at about 30% by volume.

The inlet superficial gas velocity in the slurry bed during normal or steady state operation may be in a range with a lower limit of 35 cm/s as hereinbefore indicated, with an upper limit of the range being determined by the desired minimum overall CO conversion. The lower limit may however be higher at about 40 cm/s, or even higher at about 45 cm/s. The upper limit is effected by the activity of the catalyst, but will typically not be higher than 85 cm/s.

The hydrocarbon synthesis stage, i.e. the slurry bed, may be operated at an overall CO plus $H_2$ conversion of more than 80%, preferably more than 81%, more preferably more than 82%, most preferably even more than 83%. This may be achieved by operating with a sufficiently high recycle ratio.

The hydrocarbon synthesis stage may be operated at a $C_3+$ carbon selectivity of more than 85%, preferably more than 90%, most preferably more than 92%, e.g. about 92.6%.

BRIEF DESCRIPTION OF THE DRAWINGS

The invention will now be described in more detail with reference to the accompanying diagrammatic drawing, which shows a longitudinal sectional view of an installation which can be used in a process in accordance with the invention for producing liquid and gaseous products from gaseous reactants.

DETAILED DESCRIPTION

The installation 10 includes an upright circular cylindrical Fischer-Tropsch synthesis slurry phase reactor or bubble column 12, with a bottom gaseous reactants feed inlet 14 leading into a gas distributor (not shown) inside the reactor 12 and a gaseous components outlet 16 leading from the top of the reactor 12. A liquid phase product outlet 18 leads from the reactor 12 at any convenient level.

The reactor 12 includes a first downcomer region, generally indicated by reference numeral 20. The downcomer region 20 includes a downcomer, generally indicated by reference numeral 22. The downcomer 22 includes a cylindrical transport section 24 of relatively small diameter, an outwardly flaring connecting component 26 at an upper end of the transport section 24, and a larger diameter degassing section 28, a lower end of which is connected to the connecting component 26. An upper end of the degassing section 28 thus provides an inlet 40 for slurry, while a lower end of the transport section 24 provides a slurry outlet 42. Cooling pipes 29 are also provided in the downcomer region 20.

The reactor 12 also includes a second downcomer region, generally indicated by reference numeral 30. The downcomer region 30 includes a downcomer, generally indicated by reference numeral 32. The downcomer 32 also includes a transport section 34 of relatively small diameter, an outwardly flaring connecting component 36 at an upper end of the transport section 34, and a degassing section 38 of relatively large diameter at an upper end of the transport section 34. A lower end, of the degassing section 38 is thus connected to the connecting component 36. An upper end of the degassing section 38 provides a slurry inlet, while a lower end of the transport section 34 provides a slurry outlet. Cooling pipes 39 are also provided in the downcomer region 30.

The lower end of the downcomer 32 is spaced with vertical clearance from the upper end of the downcomer 22. Furthermore, the downcomer 32 is not aligned axially with the downcomer 22. In other words, the downcomer 32 is staggered relative to the downcomer 22 when the reactor 12 is seen in plan view.

The reactor 12 also has a recycle gas stream inlet 52 which is provided at a level or an elevation above the gaseous reactants feed inlet 14. The recycle gas stream inlet 52 also leads into a gas distributor inside the reactor 12, which is not shown.

The installation 10 further includes a separation unit 54 in flow communication with the gaseous components outlet 16 and a compressor 56 in flow communication with the separation unit 54. A recycle gas stream line 58 leads from the compressor 56 to the recycle gas stream inlet 52. A liquid product line 60 leads from the separation unit 54, with a tail gas line 62 establishing flow communication between the separation unit 54 and the compressor 56. The installation 10 may include, if desired, a recycle gas stream line 59 leading into the feed inlet 14.

The reactor 12 in use provides a slurry bed zone containing a slurry bed 70 comprising 20% by volume of solid non-shifting hydrocarbon synthesis supported cobalt catalyst particles suspended in liquid phase product. The slurry bed 70 has an upper surface at a normal level 72 above the second downcomer region 30, with a head space 74 being provided above the slurry bed 70.

The reactor 12 has an internal diameter of about 10 m and the slurry bed 70 an expanded height of about 40 m, giving it an aspect ratio of about 4.

In use, a gaseous reactants feed or fresh synthesis gas comprising mainly carbon monoxide and hydrogen as gaseous reactants, is fed into the bottom of the reactor 12 through the gaseous reactants feed inlet 14, the gas typically being uniformly distributed through a sparger system or grid plate (not shown) inside the reactor 12.

Simultaneously, a recycle gas stream (typically cooled) comprising typically hydrogen, carbon monoxide, methane and carbon dioxide is fed through the recycle gas stream inlet 52 into the reactor 12 at a level above the gaseous reactants feed inlet 14 through a sparger system (not shown) inside the reactor 12. Typically, the inlet 52 is located at least about 20% of the vertical height of the slurry bed 70 above the inlet 14.

The gaseous reactants, comprising the fresh synthesis gas and the recycled gas, pass upwardly through the slurry bed 70. As the synthesis gas bubbles through the slurry bed 70, the gaseous reactants therein react catalytically to form liquid product, which thus forms part of the slurry bed 70. From time to time, or continuously, liquid phase comprising liquid product is withdrawn through the liquid phase product outlet 18, with catalyst particles being separated from the liquid product in a suitable internal or external separation system, e.g. using filters (not shown). If the separation system is located externally to the reactor, an additional system (not shown) to return the separated catalyst particles to the reactor is then provided.

The gaseous reactants feed (fresh synthesis feed gas) and optionally some or all of the recycled gas are introduced into the bottom of the reactor 12 at a rate sufficient to agitate and suspend all of the catalyst particles in the system without settling. The gas flow rates will be selected depending on the slurry concentration, catalyst density, suspending medium density and viscosity, and particular particle size used. However, in accordance with the invention, the gas flow rates and recycle gas feed points are selected such that the gases pass upwardly through the slurry bed 70 at a superficial gas velocity of at least 35 cm/s in a bottom end region of the reactor 12. This is surprisingly high, in view of the prejudice against operation at such high velocities evident from the literature and in view thereof that the use of higher gas velocities has the disadvantage that it is accompanied by a higher gas hold-up in the reactor leaving relatively less space to accommodate the catalyst-containing slurry.

Some slurry continuously passes downwardly through the downcomers 32, 22 thereby to achieve uniform redistribution of catalyst particles within the slurry bed 70, and also to ensure uniform heat distribution throughout the slurry bed 70.

The reactor 12 is operated so that the slurry bed 70 thereof is in a heterogeneous or churn-turbulent flow regime and comprises a dilute phase consisting of fast-rising larger voids of gaseous reactants and gaseous product which traverses the slurry bed 70 virtually in plug flow fashion and a dense phase which comprises liquid product, solid catalyst particles and entrained smaller voids of gaseous reactants and gaseous product which is back-mixed.

Boiler water as an indirect heat exchange or transfer medium is circulated through the coolant pipes 29, 39. Heat is transferred from the slurry bed 70 to the boiler water to form a mixture of steam and water.

Light hydrocarbon products, such as a $C_{19}$ and below fraction is withdrawn from the reactor 12 through the gaseous components outlet 16 and passed to the separation unit 54. Typically, the separation unit 54 comprises a series of coolers and a vapour-liquid separator and may optionally include further coolers and separators, and possibly also a cryogenic unit, for separation of liquid phase light hydrocarbon products, water and optionally carbon dioxide from the remaining gaseous components. Other separation technologies such as membrane units, pressure swing adsorption units and/or units for the selective removal of carbon dioxide and methane may be employed. The separated gases comprising hydrogen, carbon monoxide and other gases are compressed and recycled by means of the compressor 56 to provide the recycle gas stream. Condensed liquid hydrocarbons and reaction water is withdrawn from the separation unit 54 by means of the flow line 60 for further working up.

In accordance with a preferred embodiment of the invention, the recycle gas stream 58 is fed to the slurry bed 70 through the recycle gas stream inlet 52 and/or through the inlet 14 at a volumetric ratio of recycle gas stream/gaseous reactants feed coming in through the gaseous reactants feed inlet 14, of at least 0.4. Thus, the process 10 employs a multi-pass hydrocarbon synthesis stage defined by the reactor 12, making use of relatively large recycle ratios.

As indicated hereinbefore, it is possible that a portion of the recycle gas stream is combined with the gaseous reactants feed to be fed into the reactor 12 through the gaseous reactants feed inlet 14. Typically, between about 10% and about 60% of the total volumetric feed rate of gas entering the slurry bed 70 is fed through the recycle gas stream inlet 52, with the balance entering through the gaseous reactants feed inlet 14.

The reactor vessel 12 is typically maintained at an operating pressure of between about 10 bar and about 50 bar, more typically between about 20 bar and about 30 bar, and at an operating temperature of between 160° C. and 280° C., typically between about 220° C. and 260° C. The operating pressure and the operating temperature selected may depend on the nature and spread of gaseous and liquid product required and the type of catalyst used. Naturally, the reactor vessel 12 is provided with suitable temperature control means, such as the coolant pipes 29, 39 for controlling the reaction temperatures, as well as suitable pressure control means such as one or more pressure control valves (not shown).

In the reactor vessel 12, as the synthesis gas passes through the slurry bed 70, the carbon monoxide and hydrogen react to form a range of products in accordance with known Fischer-Tropsch reactions. Some of these products are in gaseous form at the operating conditions of the reactor 12, as mentioned hereinbefore, and are withdrawn as gaseous components through the gaseous components outlet 16, as also mentioned hereinbefore. Some of the products produced are in liquid form, e.g. waxes, at the operating conditions of the reactor 12, and act as the suspension medium for the catalyst particles, as also mentioned hereinbefore. The reactor 12 is however operated such that a per pass CO plus $H_2$ conversion of at least 60% is attained.

By way of example, the Applicant has designed a multi-pass Fischer-Tropsch slurry phase reactor to process 781940 $m^3_n$/hr of synthesis gas comprising 59.4 volume % hydrogen and 31.3 volume % carbon monoxide. In the reactor design, a 41 weight % (22 volume %) average concentration of non-shifting supported cobalt Fischer-Tropsch catalyst prepared in accordance with the teachings of U.S. Pat. No. 5,733,839, which is incorporated herein in its entirety by way of reference, is used. The expanded slurry bed in the design has an aspect ratio of approximately 4. An inlet superficial gas velocity of 41 cm/s at the reactor bottom conditions of 24.7 bar(a) and 230° C. has been applied. For the design, a recycle ratio of recycle gas stream/gaseous reactants feed of 0.8 is applied. The total recycle gas stream is fed together with the gaseous reactants feed to the bottom of the reactor. According to the design, an overall CO plus $H_2$ conversion of 89% and a per pass CO plus $H_2$ conversion of 61% can be obtained, with a $C_3$+ carbon selectivity of 92.6% and a $C_3$+ hydrocarbon products production rate exceeding 22000 barrels per day. This is a surprisingly high production rate and is much higher than ever previously envisaged. For the design, it was assumed that the catalyst activity obtained under laboratory conditions will also be attainable in a commercial scale reactor. It is however to be appreciated that, if the activity of the commercial catalyst is less, the same reactor design and performance can be achieved by using a higher average catalyst concentration.

The Applicant has surprisingly found that a per pass CO plus $H_2$ conversion (i.e. syngas conversion) in excess of 60% can be attained at a superficial gas velocity in the bottom of the reactor in excess of 35 cm/s. This allows overall syngas conversions in excess of 80% to be achieved in a single stage reactor by using gas recycle, which has cost benefits. In contrast to the generally held belief by those skilled in the art that conversion rapidly declines with increasing gas velocity as a result of increased mixing at higher velocities, the Applicant has surprisingly found that the gas retains its plug flow behaviour at high gas velocities, even in reactors with a small aspect ratio of less than 5, and that conversion is not restricted by mass transfer limitations. In other words, the space time yield surprisingly continues to improve significantly at these high superficial gas velocities, in contrast to prior art teachings. As a result, reactor productivities in excess of 420 g hydrocarbon/kg catalyst/hour can be achieved with an inlet superficial gas velocity above 35 cm/s at a per pass CO plus $H_2$ conversion of more than 60%.

Advantageously, evaluation of the reactor design has confirmed that it is a lower cost design than any of the prior art reactor designs of which the Applicant is aware, or any other design proposals that the Applicant considered for this particular Fischer-Tropsch synthesis application with the particular non-shifting Fischer-Tropsch catalyst known to the Applicant.

The invention claimed is:

1. A process for producing liquid and, optionally, gaseous products from gaseous reactants, the process comprising:
   feeding at a low level a gaseous reactants feed, including at least CO and $H_2$, into an expanded slurry bed of solid non-shifting hydrocarbon synthesis catalyst particles suspended in a suspension liquid, the slurry bed being contained in a vessel and the expanded slurry bed having an aspect ratio of less than 5;
   optionally, feeding a recycle gas stream into the slurry bed;
   allowing the gaseous reactants and any recycled gas to react with a per pass CO plus $H_2$ conversion of at least 60% as they pass upwardly through the slurry bed at an inlet superficial gas velocity of at least 35 cm/s, thereby to form liquid and, optionally, gaseous products, and with the gaseous reactants and any recycled gas and any gaseous product assisting in maintaining the solid catalyst particles in suspension in the suspension liquid, and with the liquid product forming together with the suspension liquid, a liquid phase of the slurry bed;

allowing any gaseous product and unreacted gaseous reactants and any unreacted recycled gas to disengage from the slurry bed as gaseous components into a head space above the slurry bed;

withdrawing the gaseous components from the head space;

withdrawing liquid phase from the slurry bed, to maintain the slurry bed at a desired level; and optionally, recycling some of the gaseous components from the head space to provide the recycle gas stream.

2. The process as claimed in claim 1, in which the expanded slurry bed has a height of less than about 40 m and a diameter of at least about 6 m.

3. The process as claimed in claim 1, in which the catalyst particles are present in the slurry bed in an average concentration of at least 14% by volume.

4. The process as claimed in claim 1, which is a single stage process.

5. The process as claimed in claim 1, in which the recycle gas stream is present and is being fed into the slurry bed at a volumetric ratio of recycle gas stream/gaseous reactants feed of at least 0.4.

6. The process as claimed in claim 1, which is a Fischer-Tropsch hydrocarbon synthesis process.

7. The process as claimed in claim 1, in which the recycle gas stream is present and which includes feeding, as an additional gas feed, at least a portion of the recycle gas stream into the slurry bed above the level at which the gaseous reactants feed is fed into the slurry bed.

8. The process as claimed in claim 1, in which the recycle ratio is sufficiently high so that the slurry bed is operated at an overall CO plus $H_2$ conversion of more than about 80%.

9. The process as claimed in claim 1, which includes allowing slurry to pass downwardly from a high level in the slurry bed to a lower level thereof, using slurry redistribution means or slurry redistributors, thereby to redistribute heat, liquid phase and catalyst particles within the slurry bed.

\* \* \* \* \*